United States Patent [19]
Breyer et al.

[11] 3,926,146
[45] Dec. 16, 1975

[54] APPARATUS FOR DISTRIBUTING PARTICLES

[75] Inventors: Frederick Breyer; George T. Davis; Edwin C. Krusche, all of Boca Raton, Fla.

[73] Assignee: Hollymatic Corporation, Park Forest, Ill.

[22] Filed: Feb. 4, 1974

[21] Appl. No.: 439,249

[52] U.S. Cl. .................. 118/24; 118/312; 118/324
[51] Int. Cl.² .......................................... B05B 3/02
[58] Field of Search ......... 118/16, 24, 25, 308, 312, 118/324; 222/410, 414

[56] References Cited
UNITED STATES PATENTS

| | | | |
|---|---|---|---|
| 1,097,420 | 5/1914 | Gardner | 222/414 X |
| 2,119,910 | 6/1938 | Ferry | 118/24 X |
| 2,321,082 | 6/1943 | Harshberger | 118/308 X |
| 2,731,942 | 1/1956 | Anderson | 118/16 |
| 3,511,694 | 5/1970 | Lippoldt et al. | 118/DIG. 4 |
| 3,608,474 | 9/1971 | Liepa | 118/308 X |
| 3,670,694 | 6/1972 | Vogel | 118/24 |
| 3,820,503 | 6/1974 | Tabernacki | 118/24 |

Primary Examiner—John P. McIntosh
Attorney, Agent, or Firm—Wegner, Stellman, McCord, Wiles & Wood

[57] ABSTRACT

An apparatus for distributing particles of which ground cheese is a good example onto receiving bases such as pizza shells comprising a conveyor for transporting the bases in series, a supply hopper above the conveyor for retaining a supply of the particles, a housing at the bottom of the hopper for receiving particles therefrom and having an exit above the conveyor for distributing particles on the bases, a rotatable rotor in the housing having a peripheral surface adjacent to but spaced from the inner surface of the housing to provide a conduit passage surrounding the rotor and spaced pins on the rotor substantially spanning the width of the conduit passage for aid in moving particles through the passage on rotation of the rotor and onto the underlying bases.

1 Claim, 4 Drawing Figures

APPARATUS FOR DISTRIBUTING PARTICLES

BACKGROUND OF THE INVENTION

One of the features of this invention is to provide an apparatus for distributing particles such as ground cheese onto bases such as pizza shells in which particles are urged from a hopper through a housing by a movable pin member operating in the housing and onto the bases where the particles adhering to the pins are stripped from the pins by a comb so that the particles can fall onto the traveling bases. In this apparatus the particles are moved positively by the pins and by the cooperation of the pins with the comb with the result that the amount of particles distributed on each of the series of bases is very carefully controlled so that substantially the same amount will be deposited on each base.

Thus in applying ground cheese to the pizza shells the amount is precisely controlled, in one embodiment in a range of 0.25 to 8 ounces per shell and the variation in amount between shells has a maximum variation of plus or minus 5%.

The most pertinent prior art of which applicants are aware is U.S. Pat. Nos. 774,774 and 3,648,596.

DESCRIPTION OF THE PREFERRED EMBODIMENT

Figure 1:
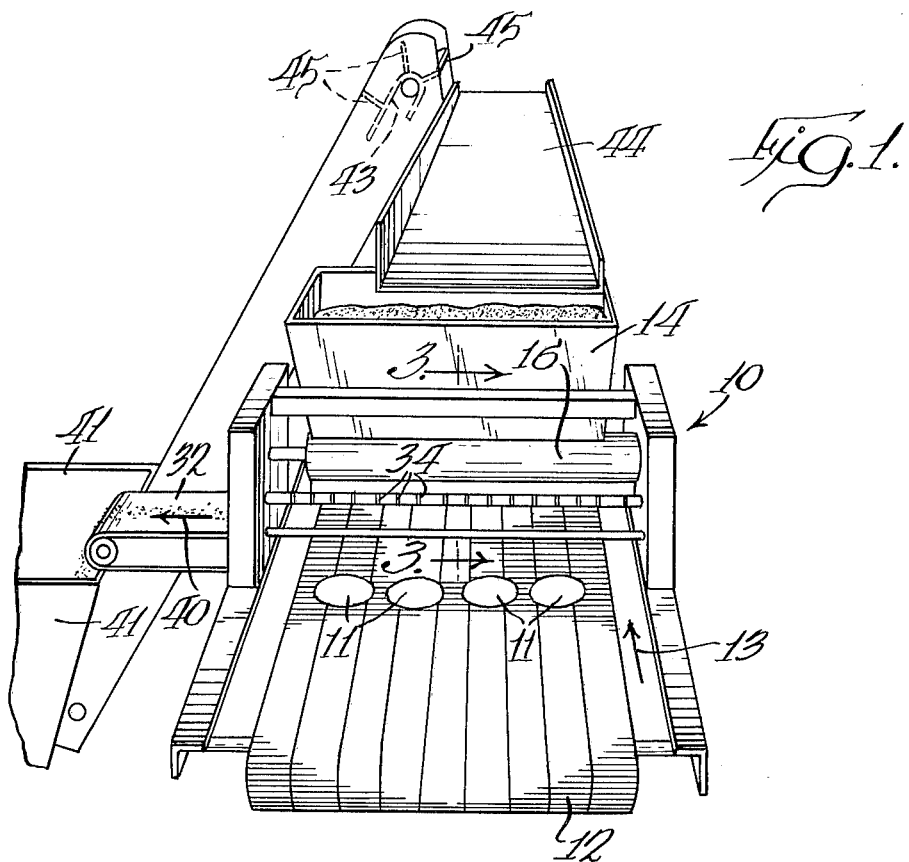
FIG. 1 is a perspective view of an apparatus embodying the invention.

In the illustrated embodiment the apparatus 10 is arranged for distributing particles of ground cheese or the like onto a traveling series of pizza shells 11 although other particles may be distributed by means of this apparatus onto other types of receiving bases either continuous or discontinuous.

The apparatus includes a movable conveyor 12 which is preferably of customary wire mesh and which may be driven by any means desired. This conveyor is movable in the direction indicated by the arrows 13 and there is provided a supply means in the form of an open topped hopper 14 above the conveyor. The bottom of the hopper 14 is open as shown at 15 in FIG. 3 to provide a first passage means from the hopper to a housing 16 which in the illustrated embodiment is generally cylindrical and horizontal. This housing 16 is provided with a second or exit passage means 17 to above the conveyor 12 for depositing the particles 18 on the underlying bases such as the illustrated pizza shells 11.

Positioned horizontally in the housing 16 is a rotatable rotor 19 which may be rotated as indicated by the arrow 20 by any means desired. This rotor has a peripheral outer surface 21 that is adjacent to but spaced from the inner surface 22 of the housing 16 to provide an annular or cylindrical conduit passage 23 that surrounds the rotor 19 and is within the housing 16 for flow of particles from the hopper 14 to the second passage means 17. This rotor 19 is provided with spaced radially projecting means 24 that substantially span the conduit passage 23 for aid in moving the particles therethrough upon rotation 20 of the rotor.

Figure 4:
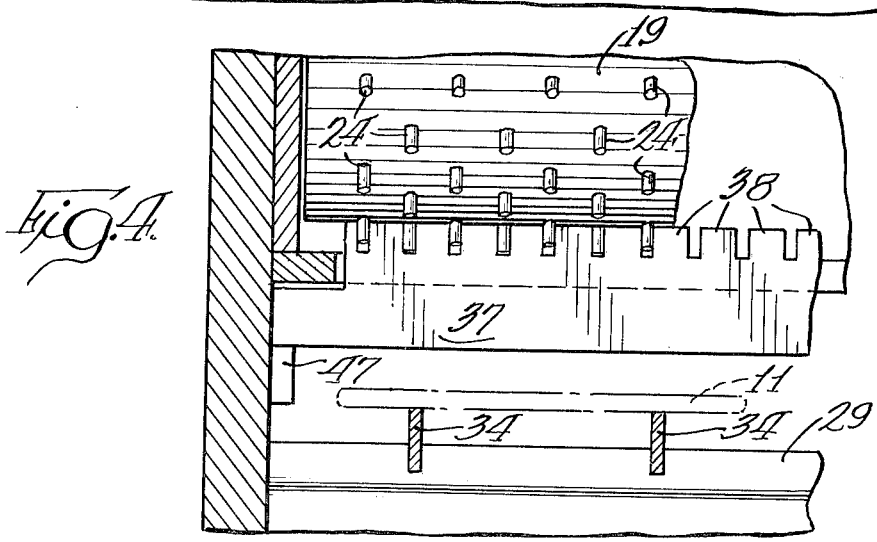
FIG. 4 is a partial and fragmentary sectional view taken substantially along line 4—4 of FIG. 3.

In the specific embodiment as is illustrated in FIG. 4 the pins 24 are in staggered circular rows.

In the embodiment shown the housing 16 and the rotor 19 are substantially cylindrical, the conduit passage 23 is annular and the housing, rotor and conduit passage are substantially concentric to each other and to the axis 26 of rotation.

Figure 3:
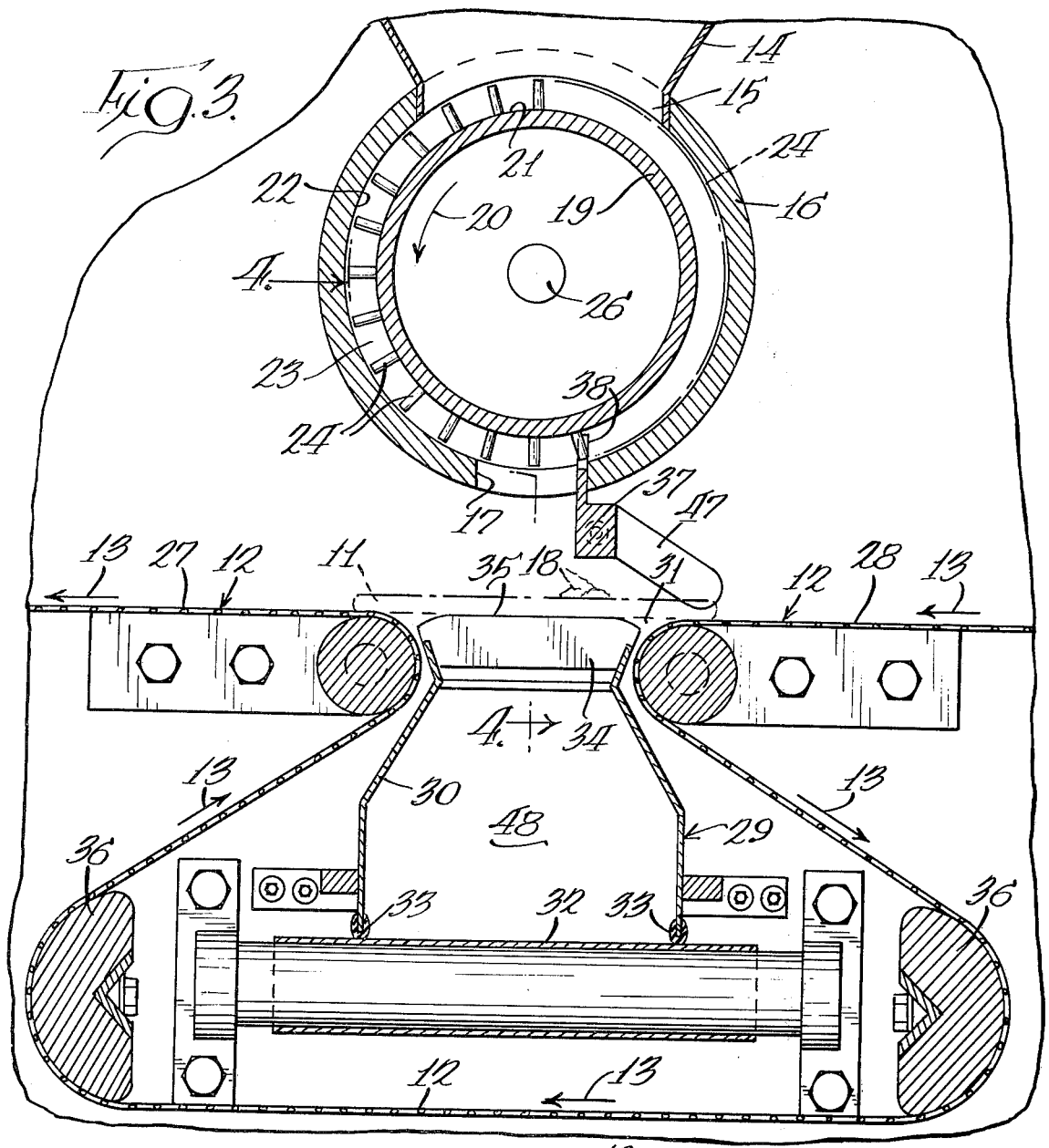
FIG. 3 is a fragmentary and enlarged vertical sectional view taken substantially along line 3—3 of FIG. 1.

As can be seen in FIG. 3 the conveyor 12 is arranged in two horizontal and linearly aligned reaches 27 and 28 that are spaced from each other directly beneath the second passage means 17. The pizza shells 11 are directed across this space where they receive the particles falling through the passage 17. Thus this spacing of the conveyor reaches provides a distributing area for the particles 18.

The apparatus also provides a recovery means for recovering particle spillage. This recovery means 29 comprises a vertical chute 30 that spans the area 31 between the two reaches 27 and 28 and beneath the chute 30 at its open bottom there is located a recovery conveyor 32. In order to prevent the particles from being lost the two longitudinal sides of the bottom of the chute 30 are provided with flexible guards 33 that substantially close the space between the bottom of the guard and chute and the conveyor 32. The front and rear 48 of the guard and chute are open.

The chute 30 at the top and between the reaches 27 and 28 is provided with open guide means comprising vertically arranged spaced guide plates 34 having horizontally aligned upper edges 35 substantially aligned with the reaches 27 and 28 of the transporting conveyor 12 so as to guide the pizza shells 11 across this recovery area 31. The spacing of the guide plates 34 and the vertical arrangement of the guide plates 34 permits the spillage to fall through the chute 30 and onto the recovery conveyor 32.

As can be seen in FIG. 3 the conveyor 12 is directed through a loop 35 connecting the horizontally aligned conveyor reaches 27 and 28 with this loop extending around the chute 30 and the recovery conveyor 32. This conveyor loop 35 is guided in its path by means of side guides 36 as is shown in FIG. 3.

In order to aid in achieving even distribution of the particles on successive bases 11 there is provided a comb 37 adjacent to the second passage means 17 with spaced teeth 38 extending across the annular conduit passage 23 and between which the pins 24 move on rotation 20 of the rotor for aid in stripping adhered particles from the moving pins 24.

Figure 2:
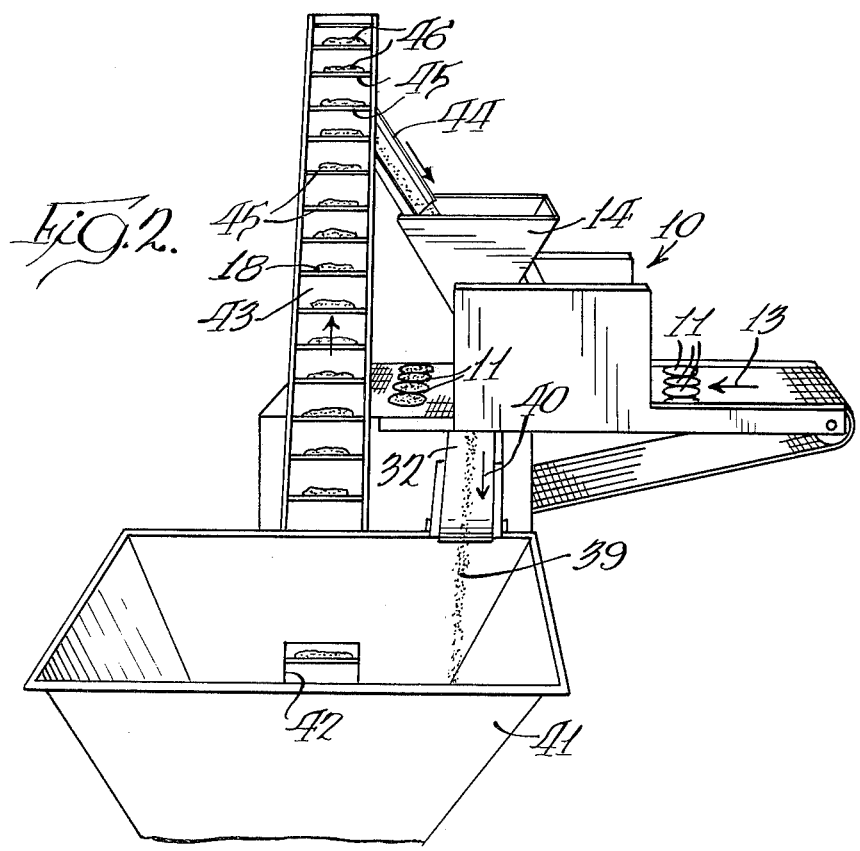
FIG. 2 is a side perspective view taken from the left side of FIG. 1.

As is shown in FIGS. 1 and 2 the recovery conveyor 32 that carries the recovered particles 39 extends generally transversely to the direction 13 of movement of the main transporting conveyor 12. This recovery conveyor may also be driven by any means desired as indicated by the arrows 40.

A recovery hopper 41 is located at one side of the transporting conveyor 12 and receives the recovered particles 39 from the conveyor 32. This recovery hopper 41 is provided with a side opening 42 that is located adjacent to the bottom of the hopper 41 and an elevating conveyor 43 has its lower end communicating with the interior of the recovery hopper 41 and its upper end communicating with a sloped trough 44 for gravity flow of the particles 18 down the trough and back into the hopper 14 through the open top thereof.

The trough 44 is provided with the customary deflector (not shown) for even distribution into the hopper.

The elevating conveyor is arranged at an angle to the horizontal as shown in FIG. 1 and is flexible and provided with spaced transverse ribs 45 for trapping and lifting successive portions 46 of the recovered particles. The upper end of the trough 44 is located beneath the upper end of the recovery conveyor 43 so that the recovered particles 18 fall by gravity onto the trough and slide down the trough also by gravity back into the hopper 14.

Thus as can be seen from the above description of the illustrated embodiment the apparatus for distributing the particles onto the bases such as the pizza shells 11 provides for an accurate distribution of the particles onto the bases. In operation the conveyor carries the bases 11 beneath the conduit passage 23 exit 17 which by combined gravity and pin urged action conveys accurate and preselected amounts of particles from the hopper 14 onto the base or bases. Thus the movable pins 24 on the rotating rotor 19 urge the particles through the conduit passage 23 and the comb 37 which is pivotally mounted and provided with weighted ends 47 cooperate with the pins in the manner described to insure an even flow of the particles. This flow is also assisted by gravity due to the arrangement of the exit passage 17, conduit passage 23, hopper 14 and comb 37 in a generally vertical series above the base or bases 11.

Then, any particles that fall between the traveling bases 11 are immediately collected by the recovery conveyor 32 by way of the chute 30 and are transported to the recovery hopper 41 where they are lifted by the recovery conveyor 43 back into the hopper 14 as described.

We claim:

1. Apparatus for depositing an adherent particulate solid material on a traveling series of articles having spaced adjacent peripheries, comprising: conveyor means for transporting said articles through a depositing station; a dispensing housing above said conveyor means at said depositing station having an opening for depositing said material by gravity fall from the dispensing housing onto the articles as said articles are transported through the station with some of the material falling beyond and between said peripheries; a receiving hopper above and communicating with the dispensing housing for supplying material from the hopper to said housing; a recovery means at said depositing station for recovering said portions of material falling beyond and between said peripheries of said articles; a rotor in said dispensing housing having a peripheral surface spaced from said housing to provide a conduit passage between the rotor and housing for conveying of said adherent material from said hopper through said conduit passage and to said conveyor and the articles thereon by way of said passage; and spaced pins on said rotor substantially spanning said passage and rotatable with said rotor for engaging and moving said adherent material through said passage on rotation of the rotor without substantial compacting of said adherent material, said conveyor means comprising a pair of spaced horizontal reaches and said recovery means at said depositing station comprising a generally vertical open chute between said reaches having two longitudinal sides, a recovery conveyor beneath the bottom of said chute and flexible guards on said chute bottom at said longitudinal sides engaging the recovery conveyor and closing the space between said chute bottom and guards and the conveyor to prevent substantial loss of said material laterally between the chute and the recovery conveyor.

* * * * *